United States Patent
Lee

(10) Patent No.: US 7,201,354 B1
(45) Date of Patent: Apr. 10, 2007

(54) VIDEO MONITOR MOUNTING SYSTEM

(75) Inventor: Jong Min Lee, Gumi (KR)

(73) Assignee: KTV USA, Inc., East Rutherford, NJ (US)

( * ) Notice: Subject to any disclaimer, the term of this patent is extended or adjusted under 35 U.S.C. 154(b) by 156 days.

(21) Appl. No.: 11/018,578

(22) Filed: Dec. 21, 2004

Related U.S. Application Data

(60) Provisional application No. 60/532,705, filed on Dec. 24, 2003.

(51) Int. Cl.
*A47F 5/08* (2006.01)

(52) U.S. Cl. ............ 248/231.9; 248/917; 361/681

(58) Field of Classification Search ............ 248/231.9, 248/226.11, 228.8, 919; 297/217.3; 224/275, 224/282, 483, 546, 547, 548
See application file for complete search history.

(56) References Cited

U.S. PATENT DOCUMENTS

| | | | | | |
|---|---|---|---|---|---|
| 4,208,944 | A | * | 6/1980 | Moryl | 411/34 |
| 4,762,437 | A | * | 8/1988 | Mitomi | 403/11 |
| 5,142,834 | A | * | 9/1992 | Laclave et al. | 52/208 |
| 5,205,447 | A | * | 4/1993 | Hambrick | 224/42.33 |
| 5,267,775 | A | | 12/1993 | Nguyen | |
| 5,507,556 | A | | 4/1996 | Dixon | |
| 5,529,265 | A | * | 6/1996 | Sakurai | 244/118.5 |
| 5,576,898 | A | * | 11/1996 | Rubin | 359/841 |
| 5,842,715 | A | * | 12/1998 | Jones | 280/727 |
| 6,125,030 | A | * | 9/2000 | Mola et al. | 361/681 |
| 6,199,810 | B1 | * | 3/2001 | Wu et al. | 248/291.1 |
| 6,216,927 | B1 | | 4/2001 | Meritt | |
| 6,435,790 | B1 | * | 8/2002 | Ichikawa | 411/349 |
| 6,557,812 | B2 | * | 5/2003 | Kutzehr et al. | 248/476 |
| 6,619,605 | B2 | * | 9/2003 | Lambert | 248/226.11 |
| 6,633,347 | B2 | * | 10/2003 | Kitazawa | 348/837 |
| 6,641,212 | B2 | * | 11/2003 | Sitzler | 297/217.3 |
| 6,654,255 | B2 | * | 11/2003 | Kruse et al. | 361/799 |
| 6,669,285 | B1 | | 12/2003 | Park et al. | |
| 2002/0005917 | A1 | * | 1/2002 | Rosen | 348/837 |
| 2002/0163776 | A1 | * | 11/2002 | Thompson et al. | 361/681 |
| 2003/0042378 | A1 | * | 3/2003 | Imamura et al. | 248/274.1 |
| 2004/0160096 | A1 | * | 8/2004 | Boudinot | 297/217.3 |

* cited by examiner

*Primary Examiner*—Carl D. Friedman
*Assistant Examiner*—Bradley Duckworth
(74) *Attorney, Agent, or Firm*—Seth Natter; Natter & Natter

(57) ABSTRACT

A video monitor mounting system for use in conjunction with seat back, head restraint or roof mount applications, includes a mounting tray fixed in a hollowed out socket formed in a seat back, the rear face of a head restraint or within a roof mount overhead console. The mounting tray includes an anchor plate having a pair of apertures each having a keyway passage. A video display assembly includes a video display panel housed in a cabinet which is pivotally connected to a shell casing. A back wall of the shell casing carries a pair of twist fasteners which are registered with the keyway passages in the anchor plate. A coin may be utilized to rotate the twist fasteners to secure the shell casing and the display panel after connecting the wiring to the display panel.

20 Claims, 2 Drawing Sheets

VIDEO MONITOR MOUNTING SYSTEM

RELATED APPLICATIONS

This application claims the benefit of U.S. Provisional Application No. 60/532,705, filed Dec. 24, 2003.

BACKGROUND OF THE INVENTION

1. Field of the Invention

This invention relates generally to vehicular entertainment systems and more particularly to a mounting system for video display panels.

2. Antecedents of the Invention

The past few years have witnessed significant innovations in vehicular technologies. In addition to safety and performance enhancements, there have been numerous improvements relating to on-board accessories, such as navigation systems and passenger entertainment systems.

Video display systems have progressed from on-board CRT video monitors in aircraft, tour buses, limousines and mobile homes, to entertainment systems employing LCD panel video displays. Independent vehicle customizers, such as van converters and limousine fabricators have customized new vans, limousines, minivans and sport utility vehicles, as well as automobiles, with audio/video entertainment systems having video panel displays. This trend has been followed by new car dealer installations of audio/video entertainment systems and by OEM installations.

Audio/video entertainment system in vehicles recently arrived at new car dealerships were generally factory installations by vehicle manufacturers or installations by tier 1, tier 2 or tier 3 suppliers or port assembly installations.

The growth in aftermarket video panel display installations has been significant. Indeed, the Consumer Electronics Association Market Activity Report through Oct. 1, 2004 indicated domestic aftermarket flat panel monitor sales for the first nine months of 2004 in excess of 400,000 units.

While the cost of flat panel monitors, such as LCD panels, as well as driving circuitry, DVD players, game hardware and related installation hardware, have decreased over the years, a significant factor in total cost has not, i.e. installation and repair costs.

There has been a need for simplifying in vehicle installations to reduce the degree of skill required of installers and to reduce the time required for installation. Another labor-intensive aspect was related to the servicing of flat panel display units. There has been a need to simplify and speed the task of removal of installed flat panel monitors for servicing and/or replacement.

SUMMARY OF THE INVENTION

A video monitor mounting system for use in conjunction with seat back, head restraint or roof mount applications, includes a mounting tray fixed in a hollowed out socket formed in a seat back, the rear face of a head restraint or within a roof mount overhead console. The mounting tray includes an anchor plate having a pair of apertures each having a keyway passage.

A video display assembly includes a video display panel housed in a cabinet which is pivotally connected to a shell casing. A back wall of the shell casing carries a pair of twist fasteners which are registered with the keyway passages in the anchor plate. A coin may be utilized to rotate the twist fasteners to secure the shell casing and the display panel after connecting the wiring to the display panel.

When the cabinet is seated in a stowed position within the shell casing, the twist fasteners are concealed from view and remain concealed when the panel is pivoted to a viewing position.

From the foregoing compendium, it will be appreciated that it is an aspect of the present invention to provide a video monitor mounting system of the general character described which is not subject to the disadvantages of the antecedents of the invention aforementioned.

A feature of the present invention is to provide a video monitor mounting system of the general character described which reduces both OEM and aftermarket installation costs.

It is a consideration of the present invention to provide a video monitor mounting system of the general character described which is well suited for relatively unskilled installation personnel.

Another aspect of the present invention is to provide a video monitor mounting system of the general character described which is relatively low in cost.

To provide a video monitor mounting system of the general character described which simplifies video panel display installations is a still further feature of the present invention.

A further consideration of the present invention is to provide a video monitor mounting system of the general character described which is well suited for low cost mass production fabrication.

A still further aspect of the present invention is to provide a video monitor mounting system of the general character described which facilitates quick removal of an installed video panel for repair or replacement.

Another feature of the present invention is to provide a video monitor mounting system of the general character described wherein twist fasteners for securement of a video display assembly are normally concealed from view.

A still further feature of the present invention is to provide a video monitor mounting system which is well suited for a variety of installation applications.

To provide a video monitor mounting system of the general character described which facilitates mounting and/or removal of a video display panel without the requirement for employment of hand tools is yet another consideration of the present invention.

Other aspects, features and considerations in part will be obvious and in part will be pointed out hereinafter.

With these ends in view, the invention finds embodiment in the various combinations of elements, arrangements of parts and series of steps by which the aforesaid aspects, features and considerations and certain other aspects, features, and considerations are attained, all with reference to the accompanying drawings and the scope of which will be more particularly pointed out and indicated in the appended claims.

BRIEF DESCRIPTION OF THE DRAWINGS

In the accompanying drawings in which is shown one of the various possible exemplary embodiments of the invention.

DESCRIPTION OF THE PREFERRED EMBODIMENT

Figure 1:
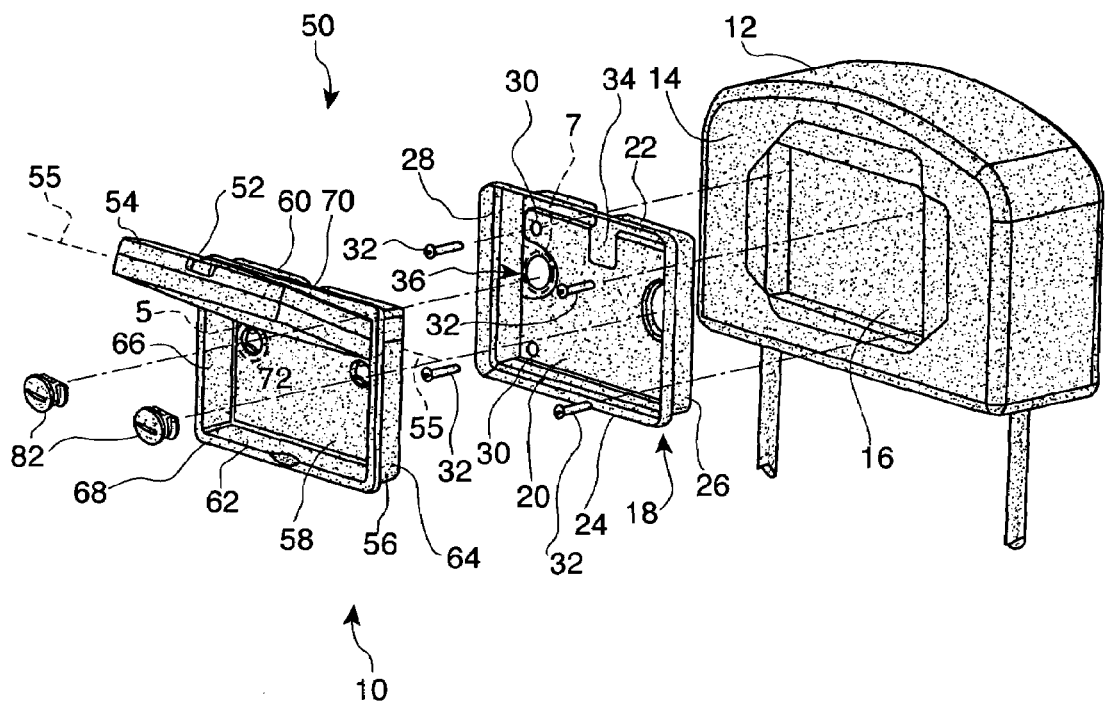
FIG. 1 is an exploded perspective view of a video monitor mounting system constructed in accordance with and embodying the invention showing a head restraint installation employing a mounting tray and with a video display assembly being secured in a position nested within the mounting tray by a pair of twist fasteners.

Referring now in detail to the drawings, the reference numeral 10 denotes generally a video monitor mounting system constructed in accordance with and embodying the present invention. The mounting system may be employed in any of a number of applications such as, for example, within a head restraint 12 of a passenger seat, within a seat back of a cabin seat or within an overhead console.

FIG. 1 illustrates a mounting system installation within a rear face 14 of the head restraint 12 and, more particularly, within a hollowed out rectangular socket 16 which is formed in the head restraint 12.

Pursuant to the invention, the mounting system 10 includes a mounting tray 18 having a generally rectangular anchor plate 20, a peripheral top wall 22, a bottom wall 24 and a pair of parallel opposed sidewalls 26, 28 all of uniform height. The anchor plate 20 and the peripheral walls 22, 24, 26 and 28 define a mounting tray cavity.

The depth of the socket 16 is such that the mounting tray 18 will be accommodated within the socket, with the peripheral walls 22, 24, 26 and 28 lying substantially flush with rear face 14 of the head restraint or slightly recessed within the socket 16.

The mounting tray 18 includes a plurality of openings 30 formed in the anchor plate 20 and through each of which a screw 32 is inserted and driven into the head restraint 12. The mounting tray may be secured within a socket 16 or any other support surface by conventional securement devices other than the screws 32, such as adhesives, rivets, clips, etc.

It should be noted that the anchor plate 20 includes a passageway 34 for control and video signal wiring (not shown) which is threaded through the vehicle seat back and head restraint 12 or, in ceiling mount installations, behind a vehicle headliner.

Figure 6:
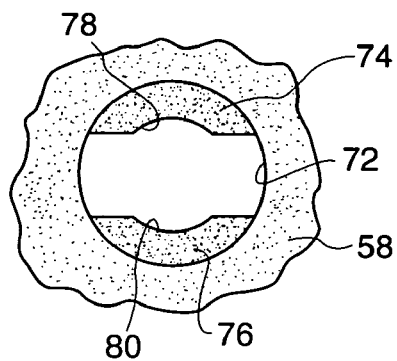
FIG. 6 is an enlarged scale fragmentary front elevational view of the twist fastener aperture illustrated in FIG. 5.

The mounting tray 18 includes a pair of noncircular apertures 36, each formed in a rearwardly offset portion 38 of the anchor plate 20. As shown in FIG. 6, each aperture 36 includes a cylindrical collar 40 which projects forwardly from the offset portion 38. At the end of the collar 40, a pair of upper and lower flanges 42, 44 are provided, leaving, in a horizontal direction, an enlarged keyway passage having arcuate ends 46, 48. The upper and lower flanges 42, 44 each include diametrically opposed concentric arcuate cut outs 43, 45.

A video display assembly 50 includes a video display panel 52, e.g. an LCD panel, housed in a generally parallelepiped or cuboid cabinet 54. The cabinet 54 is, in turn, carried in a shell casing 56. The shell casing 56 includes a rectangular back wall 58, a top peripheral wall 60, a bottom peripheral wall 62, and a pair of opposed side peripheral walls 64, 66. The back wall 58 and the peripheral walls 60, 62, 64 and 66 define a shell casing cavity.

The cabinet 54 is mounted for rotation relative to the shell casing 56 about a pivot axis 55 which extends through the side peripheral walls 64, 66. The forward edge of the peripheral walls 60, 62, 64, 66 may include a transverse bead or flange 68.

Figure 5:
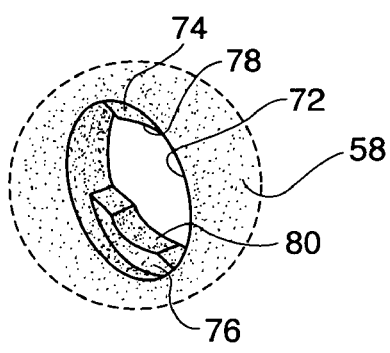
FIG. 5 is an enlarged scale partial view of a twist fastener aperture in the back wall of the shell.
Figure 7:
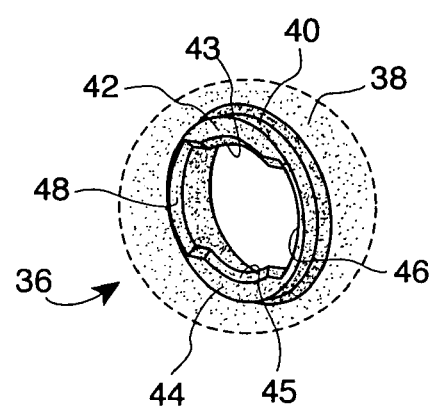
FIG. 7 is an enlarged scale partial view of a keyway passage formed in the tray.

The back wall 58 of the shell casing 56 includes a passageway 70 for wiring, and a pair of fastener apertures 72. With reference now to FIG. 5, wherein the fastener apertures 72 are shown in enlarged detail, it should be noted that each aperture 72 is generally circular except, however, for upper and lower flanges 74, 76 having diametrically opposed concentric arc portions 78, 80. The diameter spanning the arc portions 78, 80 is less than the diameter spanning the arcuate cut outs 43, 45 of the flanges 42, 44.

Figure 3:
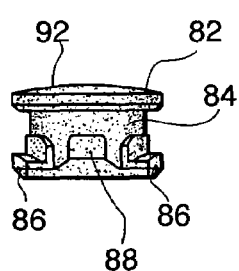
FIG. 3 is a top plan view of the twist fastener illustrated in FIG. 2.
Figure 4:
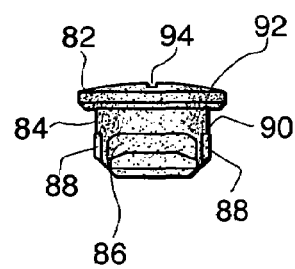
FIG. 4 is a side elevational view of the twist fastener.

Pursuant to the invention, a twist fastener 82 is inserted through and seats in each of the fastener apertures 72. As will be noted from an observation of FIGS. 2, 3 and 4, each twist fastener 82 includes an axial body 84 having a diameter less than the diameter of the arc portions 78, 80 and of the arcuate cut outs 43, 45, formed in the flanges 42, 44.

Each fastener 82 also includes, adjacent the end of the body 84, a pair of diametrically opposed radial tabs 86 having curved ends. The resulting noncircular axial fastener profile is dimensioned to pass through the fastener aperture 72 and the keyway passage of the aperture 36, when tabs 86 are horizontally oriented.

Figure 2:
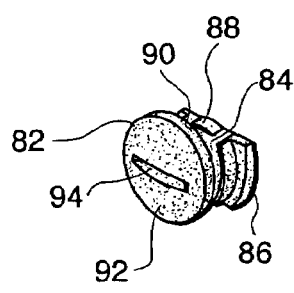
FIG. 2 is an enlarged scale perspective illustration of a twist fastener.

It should also be noted that each twist fastener 82 includes a pair of diametrically opposed radial projection retention bosses 88 which extend from the body 84 in vertical directions, as viewed in FIG. 2. Each retention boss 88 terminates with an axial abutment ledge 90.

The distance between the cylindrically curved outer surfaces of the opposed retention bosses 88 is slightly larger than the diametrical distance between the arc portions 78, 80 of the flanges 74, 76 respectively, yet less than the diametrical distance between the arcuate cut outs 43, 45. Because of this negative clearance, after the bosses are registered with the arc portions 78, 80, each twist fastener 82 must be forced through the aperture 72. When the abutment ledge 90 of each boss 88 passes rearwardly of the flanges 76, 78, the ledge 90 functions to prevent inadvertent removal of the twist fasteners 82 from the shell casing 56.

To facilitate rotation without hand tools, each twist fastener 82 includes an enlarged domed cap 92 having a slot 94, which may be engaged by a coin for rotating the fastener 82.

A simplified mounting procedure in accordance with the invention thus entails:

a) securing the mounting tray in the socket, b) positioning the twist fasteners 82 within their respective fastener apertures 72 (if the video display assembly 50 does not have the twist fasteners 82 prepositioned), c) connecting the wiring to the display panel, d) nesting the shell casing 56 within the mounting tray 18 after assuring that the twist fasteners are properly oriented (with the radial tabs 82 on a horizontal axis), e) positioning the radial tabs axially behind the flanges 42, 44, and f) rotating each twist fastener 82 one quarter turn (90°) with a coin, screwdriver or other implement, to a position wherein the radial tabs 86 are registered with the upper and lower flanges 42, 44.

Figure 8:
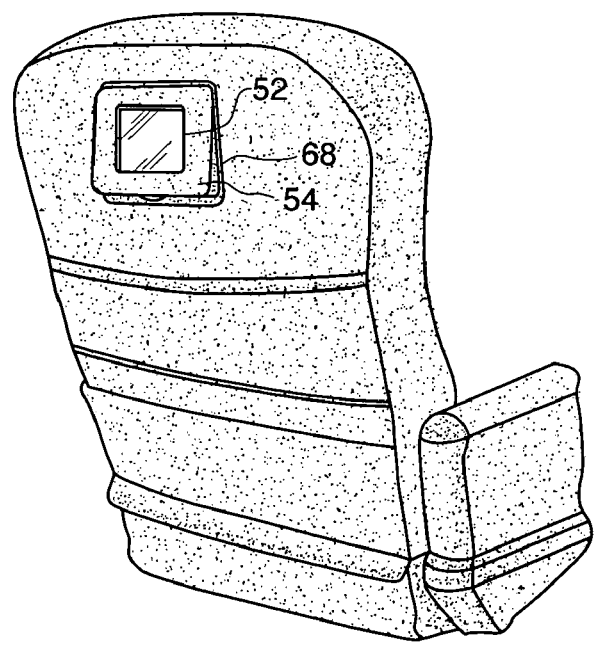
FIG. 8 is a perspective view of a seat back installation showing the video display panel at a typical viewing angle.

The video display assembly is thus securely mounted. Thereafter, the video display panel cabinet 54 is rotated, from the mounting position illustrated in FIG. 1, to a position wherein it is nested within the shell casing 56, with the video display panel 52 exposed for viewing. In a seat back or head restraint application, the viewing position may be further adjusted by rotating the cabinet 54 about the axis 55 to a suitable viewing angle as illustrated in FIG. 8.

In a roof mount, installation, the cabinet 54 is stowed in its nested horizontal position, within the shell casing 56 and is thereafter rotated downwardly to a viewing position for rear seat passengers. Such viewing position may be substantially as illustrated in the FIG. 1 orientation, with the understanding, however, that the back wall 58 of the shell casing is substantially horizontal, rather than vertical.

It should also be appreciated that the video monitor mounting system herein has been described in an exemplary manner only. Various changes are readily apparent to those of skill in the art.

Thus it will be appreciated that there is provided a video monitor mounting system of the general character described which achieves the various aspects, features and considerations of the present invention and which is well suited to meet the conditions of practical usage.

As various possible further embodiments might be made of the present invention and as various changes might be made in the illustrative embodiment set forth herein without departing from the spirit of the invention, it is to be understood that all matter herein described or shown in the accompanying drawings is to be interpreted as illustrative and not in a limiting sense.

Having thus described the invention, there is claimed as new and desired to be secured by Letters Patent:

1. A video monitor mounting system, the mounting system comprising a mounting tray, the mounting tray including an anchor plate, a support socket formed in a rearwardly facing surface of a vehicle seat back or head restraint, the anchor plate being secured to and supported by the support socket, the anchor plate having top, bottom and side peripheral walls surrounding its periphery and defining a mounting tray cavity, the anchor plate having a plurality of apertures, each aperture having a noncircular keyway passage, a video monitor assembly, the video monitor assembly including a plurality of twist fasteners, each twist fastener including a body having a head at one axial end and a noncircular portion adjacent the opposite axial end, the video monitor assembly being nestable in the mounting tray cavity with the mounting tray peripheral walls surrounding the video monitor assembly, the plurality of twist fasteners being registered with the plurality of apertures the twist fasteners being movable from a position wherein its noncircular portion registered with and positioned forwardly of the keyway passage to a locked position, wherein its noncircular portion is not registered with the keyway passage and is positioned between the anchor plate and the socket, whereby the video monitor assembly is supported by the support socket.

2. A video monitor mounting system as constructed in accordance claim 1 wherein the video monitor assembly includes a video display panel, the video display panel being carried in a shell casing, the shell casing having a back wall, the plurality of twist fasteners extending through the back wall with the head of each twist fastener positioned one side of the back wall and the noncircular portion of each twist fastener being positioned on the other side of the back wall.

3. A video monitor mounting system as constructed in accordance with claim 2 wherein each twist fastener includes a radial projection adjacent the noncircular portion, the radial projection being positioned on the other side of the back wall for preventing inadvertent disengagement between the twist fasteners and the back wall.

4. A video monitor mounting system as constructed in accordance with claim 3 wherein each twist fastener includes a pair of diametrically opposed radial projections.

5. Video monitor mounting system as constructed in accordance with claim 2, the shell casing further including top, bottom and side peripheral walls surrounding the back wall and defining a shell casing cavity, the video monitor assembly further including a video display panel housed in a parallelepiped cabinet, the cabinet being pivotally mounted to the side peripheral walls of the shell casing for rotation relative to the back wall the cabinet being nestably receivable in the shell casing cavity.

6. A video monitor mounting system as constructed in accordance with claim 1 wherein each aperture includes an annular collar and a pair of flanges at the end of the collar, the collar and the flanges defining the keyway passage.

7. A video monitor mounting system as constructed in accordance with claim 2 further including a parallelepiped cabinet housing the video display panel, the cabinet being pivotally mounted to the shell casing.

8. A video monitor mounting system as constructed in accordance with claim 2 further including a plurality of noncircular passageways formed in the back wall, each twist fastener extending through a noncircular passageway, the noncircular passageways being dimensioned larger than the noncircular portion of each twist fastener.

9. A video monitor mounting system as constructed in accordance with claim 8 wherein each twist fastener includes a radial projection adjacent the noncircular portion with negative clearance provided between the radial projection and the noncircular passageway when the noncircular portion is registered with the noncircular passageway, whereby inadvertent disengagement between the twist fasteners and the back wall is precluded.

10. A video monitor mounting system as constructed in accordance with claim 1 further including a wiring aperture extending through the anchor plate.

11. A video monitor mounting system as constructed in accordance with claim 1 wherein the noncircular portion of each twist fastener is defined by a pair of diametrically opposed radial tabs.

12. A video monitor mounting system as constructed in accordance with claim 11 wherein the radial tabs have curved radial ends.

13. A video monitor installation, the video monitor installation comprising a support having a socket, a mounting tray fixed in the socket, the mounting tray having an anchor plate, top, bottom and side peripheral walls extending from the anchor plate and defining a mounting tray cavity, the anchor plate including a plurality of apertures, each aperture having a noncircular keyway passage, a video monitor assembly, the video monitor assembly being nested in the mounting tray cavity, the video monitor assembly including a video monitor cabinet and a shell casing, the shell casing having a back wall positioned in the mounting tray cavity adjacent the anchor plate, one side of the anchor plate facing the back wall and the other side of the anchor plate facing the support socket, a plurality of twist fasteners, each twist fastener including a body having a head at one axial end and a noncircular portion adjacent the opposite axial end, the head of each twist fastener being positioned on a side of the back wall facing the cabinet, each twist fastener extending through a noncircular keyway passage, with the noncircular portion of each twist fastener being positioned on the other side of the anchor plate and being out of registration with the keyway passage, the support supporting the weight of the video monitor assembly.

14. A video monitor installation as constructed in accordance with claim 13 wherein the video monitor cabinet is pivotally joined to the shell casing.

15. A video monitor installation as constructed in accordance with claim 14 wherein the shell casing includes top, bottom and side peripheral walls surrounding the back wall and the video monitor cabinet pivots about the peripheral side walls of the shell casing.

16. A method of installing a video monitor having a video display panel housed in a cabinet, the method comprising the steps of:
 a) forming a socket in a support medium,
 b) forming a mounting tray having a cavity defined by an anchor plate and top, bottom and side walls surrounding the periphery of the anchor plate, the anchor plate having a plurality of noncircular keyway passages,
 c) securing the anchor plate to the socket,
 d) providing a shell casing dimensioned to be received in the cavity and dimensioned to receive the cabinet,
 e) extending a plurality of twist fasteners having a noncircular portion adjacent an axial end through a back wall of the shell casing,
 f) nesting the shell casing in the cavity with the back wall adjacent the anchor plate while registering the noncircular portion of each twist fastener with a noncircular keyway passage,
 g) axially extending each twist fastener through its registered noncircular keyway passage until the noncircular portion of each twist fastener is positioned rearwardly of the noncircular keyway passage,
 h) rotating each twist fastener to a position wherein the noncircular portion is out of registration with the keyway passage; and
 j) employing the support medium to carry the weight of the video monitor and to maintain the shell casing fixed relative to the support medium.

17. A method of installing a video monitor in accordance with claim 16 wherein each twist fastener includes an enlarged slotted head, the step of rotating each twist fastener including engaging the slotted head with an implement and rotating the twist fastener one quarter turn.

18. A method in accordance with claim 16 wherein the cabinet is pivotally mounted to the shell casing, the method including the further step of:
 j) rotating the cabinet relative to the shell casing to a position nested within the shell casing.

19. A method in accordance with claim 18 including the further step of:
 k) pivoting the cabinet relative to the shell casing to a suitable viewing angle.

20. A method of installing a video monitor in accordance with claim 18 wherein the shell casing includes top, bottom and side peripheral walls defining a shell casing cavity, the cabinet being pivotally mounted between the side peripheral walls, and step j) is performed by pivoting the cabinet about a pivot axis which extends transverse to the shell casing side peripheral walls.

\* \* \* \* \*